US006797317B2

(12) United States Patent
Ferro

(10) Patent No.: US 6,797,317 B2
(45) Date of Patent: Sep. 28, 2004

(54) PROCEDURE OF MAKING A DECORATIVE THERMAL-TRANSFER FILM ON A FLEXIBLE BACKING STRIP

(75) Inventor: Mario Ferro, Bastia Di Rovolon (IT)

(73) Assignee: Veneta Decalcogomme S.r.L., Bastia di Rovolon (IT)

( * ) Notice: Subject to any disclaimer, the term of this patent is extended or adjusted under 35 U.S.C. 154(b) by 193 days.

(21) Appl. No.: 10/159,285

(22) Filed: Jun. 3, 2002

(65) Prior Publication Data

US 2002/0195499 A1 Dec. 26, 2002

(30) Foreign Application Priority Data

Jun. 6, 2001 (IT) .................................... MI2001A1195

(51) Int. Cl.[7] .............................. B05D 1/38; C08J 5/18; B41M 3/12; B44C 1/165; B44C 1/17

(52) U.S. Cl. ..................... 427/148; 427/256; 427/407.1

(58) Field of Search ................................ 427/147, 148, 427/256, 407.1

(56) References Cited

U.S. PATENT DOCUMENTS

| | | | | |
|---|---|---|---|---|
| 3,007,829 A | | 11/1961 | Akkeron | |
| 5,827,603 A | | 10/1998 | Suess | |
| 6,224,958 B1 | * | 5/2001 | Mahn, Jr. | 428/40.1 |

FOREIGN PATENT DOCUMENTS

| | | | |
|---|---|---|---|
| EP | 0 312 288 | | 4/1989 |
| EP | 0 790 284 | | 8/1997 |
| JP | 02-270593 | * | 11/1990 |
| WO | WO 00/20229 | | 4/2000 |
| WO | WO 00/58117 | | 10/2000 |
| WO | WO 02 / 23664 | * | 4/2001 |

* cited by examiner

*Primary Examiner*—Erma Cameron
(74) *Attorney, Agent, or Firm*—Lowe Hauptmand Gilman & Berner LLP

(57) ABSTRACT

A method of forming on a flexible backing strip a decorative thermal-transfer film containing graphics defined by images and/or texts and by a progressive identification code (bar code, alphanumeric code, etc.) assigned to each graphic; the method providing for applying on the backing strip a first polymer film, on which the graphics are screen printed, and the respective progressive identification codes are thermographically printed; and a second polymer film is then applied on the first film, so that the graphics and associated identification codes are interposed and packed between the two polymer films to form the decorative film. The polymer films are made of polymer materials compatible with both the screen printing and thermographic printing inks and/or pigments used.

8 Claims, 1 Drawing Sheet

PROCEDURE OF MAKING A DECORATIVE THERMAL-TRANSFER FILM ON A FLEXIBLE BACKING STRIP

The present invention relates to improvements in methods of thermally transferring decorative films onto objects of various types.

BACKGROUND OF THE INVENTION

As is known, decorations, images, and texts can be applied to objects of various types from an appropriately printed flexible strip by means of thermal transfer methods, which provide for applying to a wide range of articles of different materials (rubber, plastic, leather, metal, etc.) graphics which serve both as decoration and as a "label" indicating the product or maker.

The images and/or texts in the graphic to be applied to the objects are screen printed on a backing strip, typically made of polyester; and each frame used carries a given number of graphics, which are transferred to the backing strip to obtain, on the strip, a succession of identical (or at least periodically repeated) graphics.

The problem arises, however, of assigning to each graphic constituting each label, and which is the same for all the objects, a code identifying the individual object, e.g. a bar code or progressive number for identifying, by means of the label, the object to which the label is applied. Screen printing obviously fails to provide for achieving this, unless an unreasonable number of different frames is used, which is practically unfeasible.

SUMMARY OF THE INVENTION

It is an object of the present invention to provide a method designed to solve the above problem, and which, in particular, is cheap and easy to implement, and provides for forming on a flexible backing strip a decorative thermal-transfer film containing graphics defined by images and/or texts and by a progressive identification code assigned to each graphic.

According to the present invention, there is provided a method of forming on a flexible backing strip a decorative thermal-transfer film containing graphics defined by images and/or texts and by a progressive identification code assigned to each graphic; the method being characterized by comprising: a backing strip processing step, in which a first polymer film is applied to said backing strip; a screen printing step, in which, on said first film, is printed a succession of graphics of images and/or texts which are repeated along said backing strip; a thermographic printing step, in which, on said first film bearing said graphics, a progressive identification code is printed at each graphic; and a finish step, in which a second polymer film is applied on said first film bearing said graphics and associated identification codes, so that said graphics and associated identification codes are interposed and packed between said first and said second film to form said decorative film.

More specifically, said first film is made of a polymer material compatible with the screen printing inks and/or pigments used in said screen printing step, and with the thermographic inks and/or pigments used in said thermographic printing step, so that said screen printing and thermographic inks and/or pigments adhere to said first film.

The graphics can thus be formed cheaply and easily with all the advantages of screen printing, while at the same time assigning a different progressive identification code to each graphic.

The specific sequence of steps and the choice of materials according to the invention provide, not only for high-quality printing of the screen printed images and/or texts and the identification codes, but also for long-lasting results, by preventing delamination or detachment of the codes from the objects to which the graphics are applied. According to the invention, in fact, the graphics and associated identification codes are firmly connected and packed between the two polymer films.

BRIEF DESCRIPTION OF THE DRAWING

A non-limiting embodiment of the present invention will be described by way of example with reference to the accompanying drawings, e.g., FIGS 1a–1c, showing, schematically, the main steps in the method according to the invention.

DETAILED DESCRIPTION OF THE INVENTION

Figure 1A:
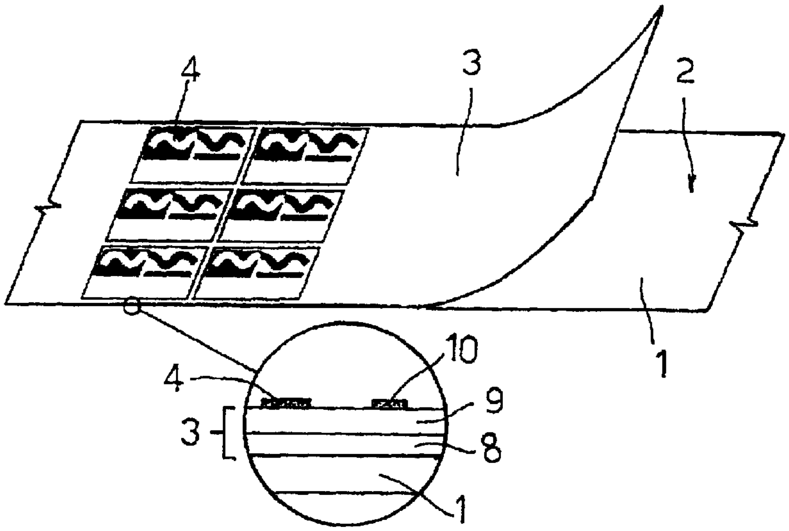
Figure 1B:
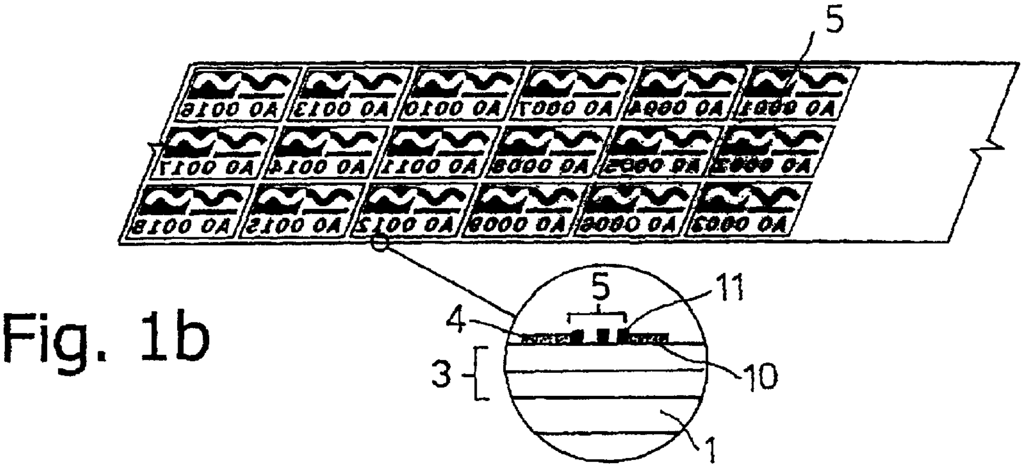
Figure 1C:
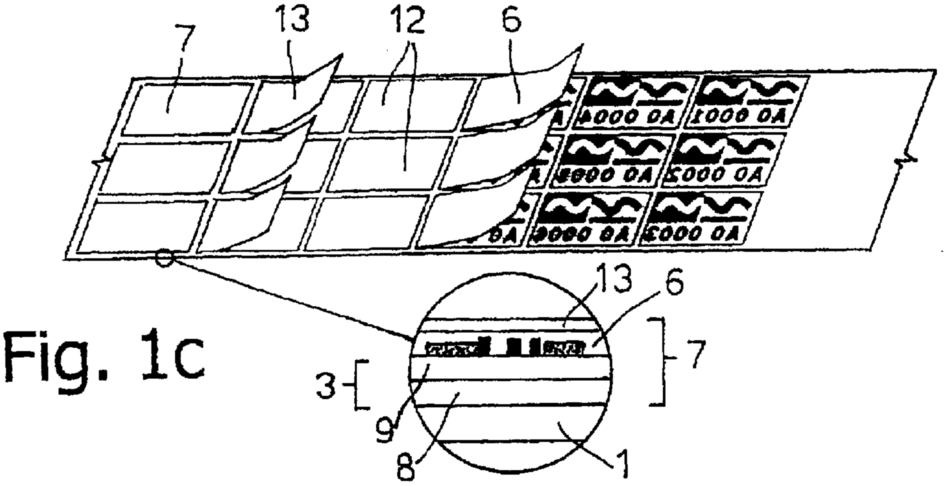

With reference to the accompanying drawings, the method according to the invention provides for performing on a flexible backing strip 1, e.g. of polyester or other synthetic fiber, a processing step, in which a substantially continuous first polymer film 3 of uniform thickness is applied to one face 2 of backing strip 1; a screen printing step, in which, on film 3, is printed a succession of graphics 4 of images and/or texts which are repeated along backing strip 1; a thermographic printing step, in which, on film 3 bearing graphics 4, a progressive identification code 5 (bar code, alphanumeric code, etc.) is printed at each graphic 4; and a finish step, in which a second polymer film 6 is applied on film 3 bearing graphics 4 and associated identification codes 5, so that graphics 4 and associated identification codes 5 are interposed and packed between films 3 and 6 to form a decorative thermal-transfer film 7.

Film 3 is made of polymer material selected for its specific affinity with the inks and/or pigments used in both the screen printing step and the thermographic printing step. The polymer material selected for film 3 must therefore be compatible with said inks and/or pigments, so that the inks and/or pigments adhere firmly to film 3.

Film 3 may be applied, for example, by treating backing strip 1 with a thermoplastic polymer resin and organic, preferably aromatic, solvent solution. In particular, good results in terms of printing quality and adhesion have been obtained with a film 3 made of vinyl-based UV-cross-linkable resins, particularly vinyl chloride-vinyl acetate resins in aromatic solvent.

Film 3 advantageously comprises two superimposed layers 8, 9 defined respectively by a known so-called "release" polymer composition, which is applied directly on face 2 of backing strip 1, and permits release of film 3 from backing strip 1 by hot compression; and by a substantially transparent protective polymer composition, which is applied on release layer 8 and is compatible with the inks and/or pigments used in the thermographic and screen printing steps. The release polymer composition may, for example, be acrylic-epoxy-resin-based, the transparent protective polymer composition may be vinyl-resin-based, and the polymer compositions may be applied to backing strip 1 in organic solvents in two successive passes.

Once provided with film 3, backing strip 1 is fed, e.g. in a reel, to a known screen printing machine (not shown), where the screen printing step is performed in known manner not described in detail for the sake of simplicity. Briefly, at the screen printing step, a stencil, defined by synthetic fabric (e.g. nylon or polyester) stretched tightly on a frame, is placed a small distance over backing strip 1, facing face 2 with film 3. The stencil has areas covered with a material impermeable to ink (e.g. a photosensitive gel etched using an appropriately impressed film), and open areas through which a screen printing ink or pigment 10, poured on the frame, is pressed with a squeegee through the fabric onto backing strip 1 to form the images and/or texts of graphics 4. For designs of more than one color, a stencil is prepared for each color, according to the areas to be printed by each color, and the process is repeated with a different stencil and a different ink or pigment for each color in the design.

Once graphics 4 are printed on film 3, backing strip 1 is sent to a known thermographic printer (not shown) to perform the thermographic printing step. As is known, thermographic printing substantially comprises transferring a meltable ink or pigment from a thermographic strip to the substrate for printing by means of a printing head with electronically activated heating elements. In the example shown, the thermographic strip is brought into contact with backing strip 1, on the film 3 side with graphics 4, and the meltable thermographic ink or pigment 11 is applied to film 3 to form identification codes 5 in the blank areas not occupied by the screen printed images or texts, so that thermographic ink or pigment 11 adheres to film 3, with which it has a specific affinity. Good results have been obtained using a commercial thermographic strip such as Thermal Transfer Roll for Jaguar 27 U printers, manufactured by ITW Compumar.

Backing strip 1, now bearing graphics 4 with both the screen printed images and/or texts and thermographically printed identification codes 5, is then sent to the finishing step to apply film 6, which may be applied, for example, by again treating backing strip 1 with a polymer resin and organic solvent solution. Like film 3, film 6 is preferably also made of polymer material compatible with the printing inks and/or pigments used in both the screen printing and thermographic printing steps, e.g. the same material as for film 3. Whereas film 3 is transparent so that, in use, graphics 4 underneath are visible, film 6 may be colored or pigmented to form a background (e.g. white) against which graphics 4 stand out more clearly.

Film 6 is appropriately only applied to graphics 4, and therefore to a number of separate areas 12, each of which defines a respective decorative film 7.

Before film 6 is applied, a further screen printing step may be performed to complete the images and/or texts in graphics 4.

Finally, over film 6, and only at areas 12 defining respective decorative films 7, a known heat-stick layer 13 is applied by which to stick decorative films 7 to a solid object by hot compression.

At this point, backing strip 1 can be used in a process for reproducing on solid objects of various materials (plastic, rubber, ceramic, metal, etc.) graphics comprising images and/or texts and a progressive identification code associated with each graphic. Backing strip 1 is placed with decorative film 7 contacting a predetermined surface portion of the object to be decorated, and is simply compressed and heated at decorative film 7 to transfer decorative film 7 from backing strip 1 onto the surface of the object. Release layer 8 enables decorative layer 7 to be transferred thermally under pressure from backing strip 1 onto the object for decoration, while heat-stick layer 13 ensures adhesion of decorative film 7 to the object.

Clearly, changes may be made to the methods described and illustrated herein without, however, departing from the scope of the present invention.

What is claimed is:

1. A method of forming on a flexible backing strip (1) a decorative thermal-transfer film (7) containing graphics (4) defined by images and/or texts and by a progressive identification code (5) assigned to each graphic; the method being characterized by comprising: a backing strip processing step, in which a first polymer film (3) is applied to said backing strip (1); a screen printing step, in which, on said first film (3), is printed a succession of graphics (4) of images and/or texts which are repeated along said backing strip (1); a thermographic printing step, in which, on said first film (3) bearing said graphics (4), a progressive identification code (5) is printed at each graphic; and a finish step, in which a second polymer film (6) is applied on said first film (3) bearing said graphics (4) and associated identification codes (5), so that said graphics (4) and associated identification codes (5) are interposed and packed between said first and said second film (3, 6) to form said decorative film (7).

2. A method as claimed in claim 1, characterized in that said first film (3) is made of a polymer material compatible with the screen printing inks and/or pigments (10) used in said screen printing step, and with the thermographic inks and/or pigments (11) used in said thermographic printing step, so that said screen printing and thermographic inks and/or pigments adhere to said first film (3).

3. A method as claimed in claim 2, characterized in that said second film (6) is also made of a polymer material compatible with said screen printing and thermographic inks and/or pigments (10, 11), so that said screen printing and thermographic inks and/or pigments (10, 11) also adhere to said second film (6).

4. A method as claimed in claim 3, characterized in that said first and said second film (3, 6) are made from solutions of vinyl-based UV-cross-linkable resins in organic solvent.

5. A method as claimed in claim 2, characterized in that said first film (3) comprises two superimposed layers (8, 9) defined respectively by a release polymer composition, which is applied directly on said backing strip (1) and permits release of said first film (3) from said backing strip (1) by hot compression; and by a substantially transparent protective polymer composition compatible with said screen printing and thermographic inks and/or pigments (10, 11).

6. A method as claimed in claim 5, characterized in that said release polymer composition is acrylic-epoxy-resin-based, and said transparent protective polymer composition is vinyl-resin-based; said polymer compositions being applied in organic solvents.

7. A method as claimed in claim 1, characterized by also comprising a step of applying to said second film (6) a heat-stick layer (13) by which to stick said decorative film (7) to a solid object by hot compression.

8. A method of reproducing on solid objects graphics (4) defined by images and/or texts and by a progressive identification code (5) assigned to each graphic; the method being characterized by comprising the steps of: placing, on a surface of the object for decoration, the backing strip (1) provided with a decorative thermal-transfer film (7) and formed as claimed in claim 1; and compressing and heating said backing strip (1) to transfer the decorative film (7) from the backing strip (1) onto the surface of the object.

* * * * *